June 6, 1939.    J. S. MILLER ET AL    2,161,482
ASSEMBLING INSTRUMENT FOR PILING
Filed Aug. 30, 1938    2 Sheets-Sheet 1
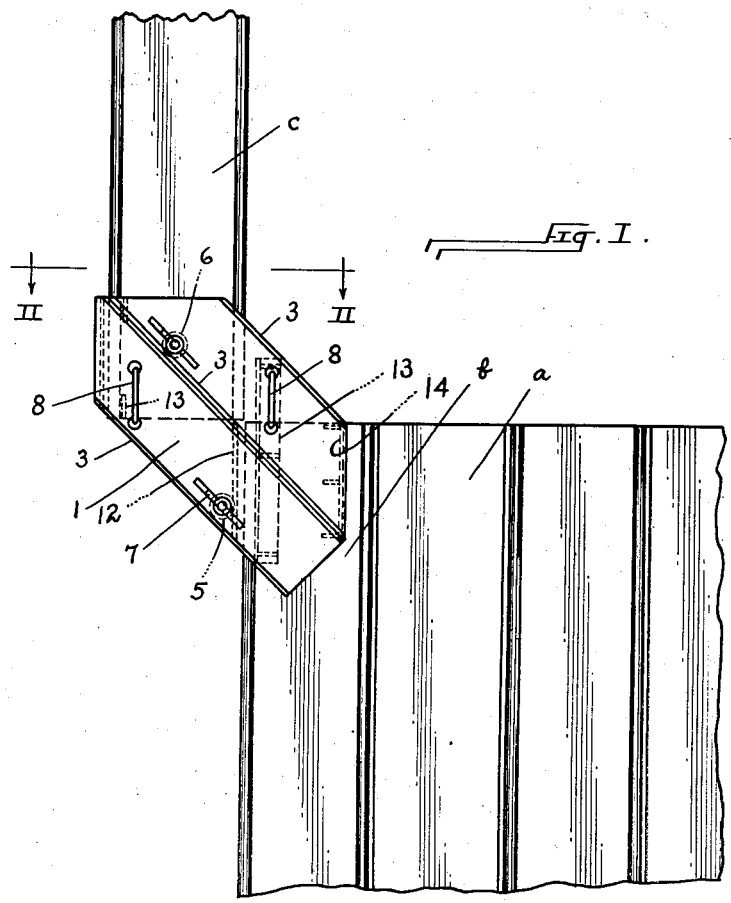
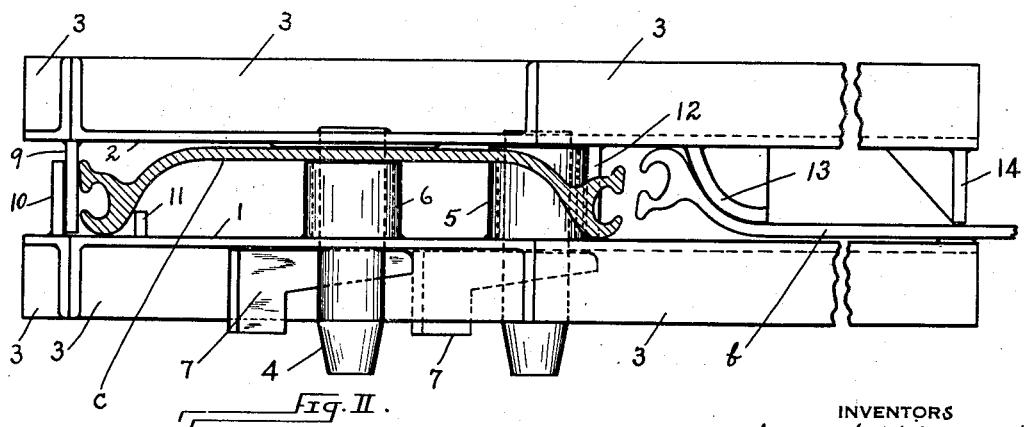
INVENTORS
James S. Miller, and
Byron E. Rhoads
by Christy and Wharton
attorneys

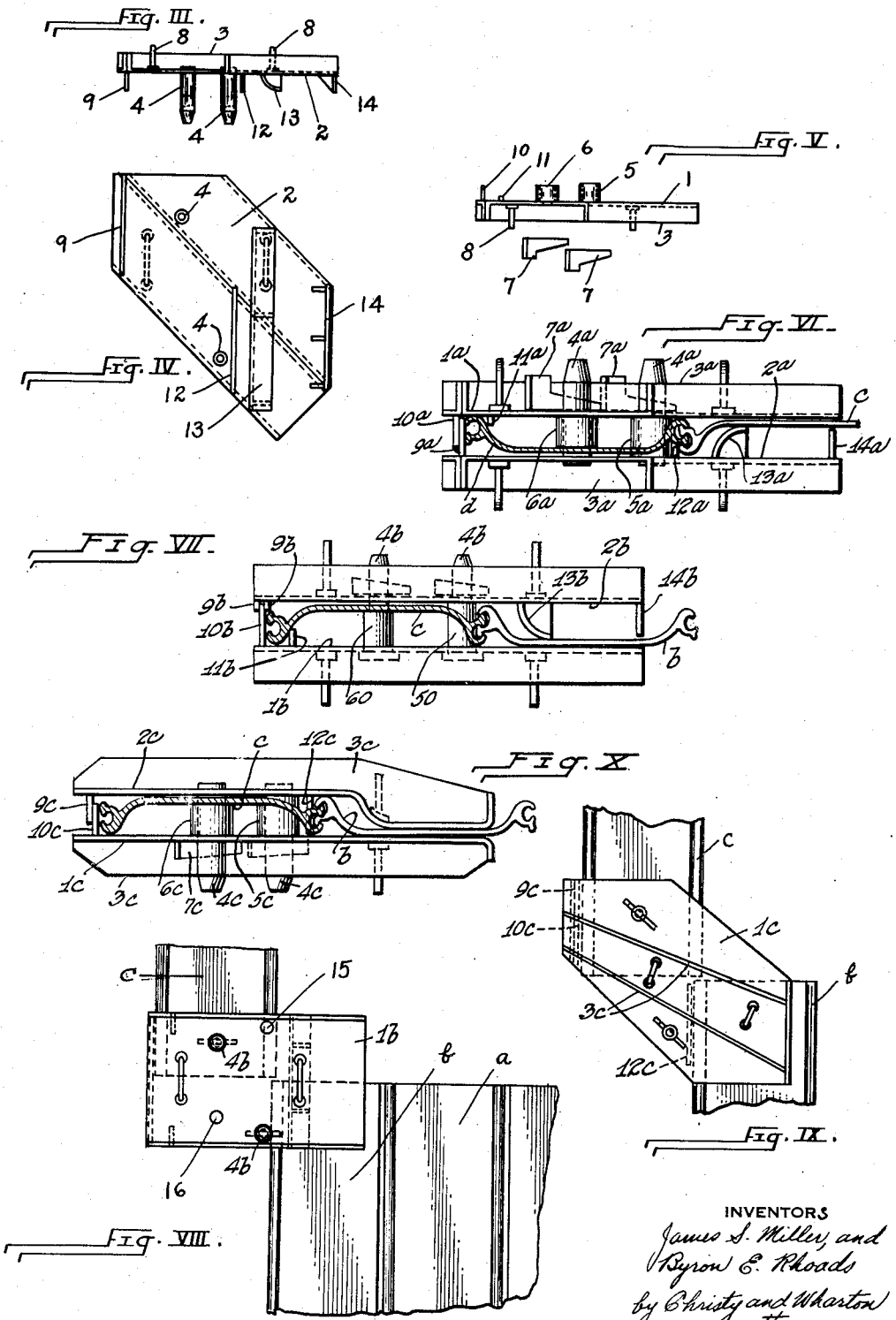

Patented June 6, 1939

2,161,482

UNITED STATES PATENT OFFICE 2,161,482

ASSEMBLING INSTRUMENT FOR PILING

James S. Miller and Byron E. Rhoads, Neville Island, Pa., assignors to Dravo Corporation, a corporation of Pennsylvania Application August 30, 1938, Serial No. 227,511

4 Claims. (Cl. 61—53)

This invention relates to the manipulation of sheet piling, and consists in an instrument, an attachment, that may be removably applied to lengths of sheet piling while they are in course of assembly, and that shall so limit and define relative movement between two lengths of piling as to enable workmen to effect the assembly with safety, facility, and expedition.

In the accompanying drawings Fig. I is a fragmentary view in side elevation of a wall of sheet piling in course of erection, and showing the instrument of the invention applied and in service position; Fig. II is a view to larger scale, showing in horizontal section the same assembly. The plane of section of Fig. II is indicated in Fig. I, by the line II—II. Fig. III is a view in plan, and Fig. IV a view in elevation of one of the two body parts of the attachment of the invention; Fig. V is a view in plan of the companion body part, together with the securing wedges; Fig. VI is a view in plan to a larger scale than Fig. V of a second instrument in service assembly, comparable to that of Fig. II, and of complementary form to the instrument of Figs. I-V. This complementary instrument and the instrument of Figs. I-V together constitute a complete equipment, for erecting a wall of sheet piling of usual structure. Figs. VII (corresponding to and on the scale of Fig. VI) and VIII (corresponding to and on the scale of Fig. I) illustrate a single instrument that is reversible, and by virtue of its reversibility is adapted to serve alternately as the complementary instruments of Figs. II and VI serve; so that, in this case, one instrument suffices. Figs. IX and X correspond to Figs. I and II, and serve to indicate a modification of structure.

The instrument of Figs. I-V consists of two body parts 1 and 2 and means of removably securing them in assembled position. Each body part consists essentially of a plane-faced plate, to which the numerals 1 and 2 are immediately applied, strengthened by stiffening flanges 3 upon their backs or outer faces. One of the body parts is provided with pins 4 and the other with orifices surrounded by spacing sleeves 5 and 6. The pins near their distal ends are slotted, and wedges 7 are provided which, inserted in such slots, secure the two body parts of the instrument in assembly. The lengths of sheet piling a, b, c, etc. are prepared for the practice of the invention by the punching through their webs of suitably spaced holes. Through such holes, when assembly is being made, the pins 4 are caused to pass; and thus the instrument is assembled rigidly on a length of piling, as in Figs. I and II it is shown to be assembled with the length c. It will particularly be remarked that the sleeve 5 is of greater length than the sleeve 6, but, comparing Figs. I and II, it will be seen that, while sleeve 5 springing from plate 1 bears at its distal end upon plate 2, sleeve 6 bears immediately upon the web of the length of piling c. The sleeve 6 being shorter than sleeve 5 by substantially the thickness of the web of the length of piling, the assembly is made secure with the opposite plates 1 and 2 extending in parallelism. The parts 1 and 2 are conveniently provided upon their backs or outer surfaces with handles 8.

The body parts 1 and 2 are so shaped and proportioned that, being assembled upon one length of piling c, their faces extend (with proper tolerance) in coincidence with the limiting inner and outer planes of the length of piling to which they are applied and upon which they are secured, and they are adapted to extend similarly over the inner and outer faces of an adjacent length of piling b, as shown in Figs. I and II.

The plates 1 and 2 that constitute the body parts of the instrument as shown in Figs. I-V are elongate, and, when assembled upon a vertically extending length of piling (cf. Fig. I), extend obliquely downward and to the right. The plates at their upper left-hand ends are provided with outstanding, vertically extending flanges 9, 10, and 11. These flanges form with the plates a pocket that in the assembly closes upon the left-hand edge of the length c of piling. These flanges afford greater precision and security to the assembly.

In an intermediate portion of their extent and at the right-hand edge plates 1 and 2 are provided with the vertically extending flanges 12, 13, and 14, and these with the plates themselves form a pocket that in assembly may close upon the adjacent length of piling b, as shown in Fig. II. The spacing of the flanges 12 and 13 is such as to allow play of length c relatively to length b in the plane of extent of the wall horizontally, through a confined but sufficient range. Relative movement vertically is without limit. Flange 14 serves, in cooperation with flanges 12 and 13, to hold the two engaged lengths of piling in proper transverse alignment.

In the assembly the flange 12 in its upward extent falls short of the plane of the lower edge of the length of piling c. Thus in the united assembly the instrument, borne by length c, forms with its flanges 12 and 13 an eye, through which the coupling edge of the length b is threaded.

The eye thus characterized is of such extent in the direction of the transverse extent of the instrument that, as will be realized on considering Fig. II, the adjacent lengths of piling b and c may move longitudinally in relation to one another, their edges free of contact. Such position is indicated in Fig. II. Alternatively, when the length c has been raised to the position shown in Fig. I, the length c may be shifted to the right, carrying with it the instrument that has been described, and then the marginal interlocking edges of the lengths b and c will come into vertical alignment, and in the ensuing descent of the length c the two lengths b and c may be united in interlocked positions.

Flange 12 is adapted to be abutted upon by the left-hand edge of length b and to serve as a stop to left-to-right play of length c.

Operation is as follows: Referring to Fig. I, let it be understood that a wall of piling is being erected, that interlocked lengths a and b have been placed, and that length c in turn is to be placed. Length c, previously punched at its lower end with holes for the passage of the pins, as described, is borne by a crane in vertical position and lowered in approximately edge to edge position, adjacent length b, until its lower end comes to convenient distance above the surface, whether of land or water, where workmen have access to it. To the lower end of the length c the instrument is secured by closing the parts upon it and upon one another in the manner described, and by applying and driving home the wedges 7. In making this assembly the parts are closed upon the adjacent length of piling b, in such manner that the pocket formed by the plates 1 and 2 with their flanges 12, 13, and 14 closes upon the length of piling b, as seen in Fig. II. The crane then is operated, and length c is raised, until it comes to the position relative to the fixed length b that is illustrated in Fig. I. A slight shift to the right (a shift easily accomplished by crane manipulation, and limited by stop 12) brings the right-hand edge of length c into vertical alignment with the left-hand edge (of complementary shape) of length b. (The engagement of the edge of the length b within the pocket of the instrument still restrains length c from lateral movement in any other direction.) Thereupon a lowering of length c causes it to descend in desired interlock with length b. When the length c has been lowered within reach, the workmen withdraw the wedges 7 and remove the instrument. Lowering then is completed and length c in interlocked engagement with length b is driven home and thus becomes the next succeeding section of the progressively erected wall.

The use of the invention in the erection of a wall of piling obviates the necessity of having a workman at the upper edge of the wall to perform the difficult and dangerous task of bringing the free length of piling into interlock, as it descends, with the adjacent previously set length. The instrument is simple in structure and easy of manipulation, and is effective, so that work may go forward, even in high wind.

The particular form of sheet piling that is illustrated in the drawings is a form of general use. As best shown in Fig. II, it is of essentially channel shape in cross-section, and the marginal flanges of the channel are particularly shaped for interlock. The edges are bifurcated, and the bifurcated edges are adapted for interlock with adjacent oppositely placed but identical lengths of piling.

It needs but a moment's reflection, then, to realize that the instrument, specifically shaped as shown in Figs. I and II, though effective in making the union shown between the left-hand end of length b and the right-hand end of length c, and effective in making the second union thereafter, cannot be effective in making union between the left-hand end of length c and the next succeeding length. A full complement of equipment then requires two instruments—that of Figs. I-V, and a second instrument, otherwise a duplicate, but having its pockets for engagement with the coupling edges of the lengths of piling oppositely disposed with respect to the mid-plane. Such second and complementary instrument is indicated in Fig. VI. Comparison of Fig. VI with Fig. II will suffice to illustrate what has been said. The second instrument consists of two body parts 1a and 2a, re-enforced upon their backs or outer faces with flanges 3a, and provided with co-operating pins 4a and orifices surrounded by spacing sleeves 5a and 6a. Wedges 7a inserted in slots in the distal ends of the pins secure the parts in assembly upon the work. From the face of body part 1a extend flanges 10a and 11a, and from the face of body part 2a extend flanges 9a, 12a, 13a, and 14a. The arrangement is, as has been said, complementary to that of the instrument of Fig. II, and the two instruments serve the common end indicated.

In Figs. VII and VIII a modification is shown, in which the two body parts 1b and 2b of the instrument extend horizontally and are symmetrical with respect to a horizontal mid-plane. The instrument is thus rendered invertible. One of the two pins 4b, 4b (the lower, Fig. VIII) is shifted from a position of penetration through the web of length c and abuts, when the instrument is assembled, upon the left-hand edge of length b, and so serves in place of the flange 12, which is dispensed with. The pins 4b, 4b are turned with enlarged shanks 50, 60, which serve the same function as spacing sleeves, so that spacing sleeves are dispensed with. The flanges 10b and 11b upon part 1b are retained; and flanges 9b, 13b, and 14b upon part 2b. Flange 9b indeed becomes two flanges that engage flange 10b upon its opposite faces. A second symmetrically placed set of pin holes 15 and 16 is formed through the two plates. The so modified instrument, (though affording less rigidity) has the advantage that a single instrument suffices.

The instrument of Figs. IX and X differs from that of Figs. I and II in that one of the two cooperating plate members, the member 2c, is modified in shape. Throughout part of its extent, it is adapted to stand spaced from the companion member 1c as member 2 of Figs. I and II is spaced from member 1, and in that respect to serve like purposes, but in its right-hand position as seen in these figures, the member 2c is deflected so as immediately to engage (with suitable clearance for purpose of assembly) the web of the channel-shaped length of piling b over the inner surface of the web, while the member 1c engages the length b over the outer surface of the web. The two members 1c and 2c are re-enforced upon their outer faces, as in the instruments already described, with flanges 3c; they are equipped with co-operating pins 4c, orifices surrounded by spacing sleeves 5c and 6c, and securing wedges 7c. From the face of the member 2c the flanges 9c and 12c stand out, and from the face of member 1c the flange 10c stands out. The cooperation of these flanges will be manifest from what has gone before, and with Figs. IX and X of the drawings in view. Figs. IX and X show the length of piling c with the instrument of the invention secured to it in raised position and shifted when in raised position from left to right, so that the edges of the two lengths b and c are in vertical alignment, for interengagement on the descent of length c.

We claim as our invention:

1. An assembling fixture for sheet piling consisting of two plates, spacing members borne by the plates, and means borne by the plates for securing them rigidly in application upon opposite faces of a length of piling with lateral extension therefrom, the said plates with their spacing members forming in such assembly an eye adapted to be closed upon the edge of an adjacent length of piling that stands in edge to edge alignment, the assembly permitting relative transverse movement within fixed limits between the two lengths of piling in the direction of their planar extent and unlimited relative longitudinal movement.

2. An assembling fixture for sheet piling consisting of two plane-faced plates provided with outstanding flanges and with means for securing them rigidly in face-to-face positions upon the opposite faces of a length of piling with lateral extension therefrom, the flanges upon the lateral extension of the fixture themselves extending in the direction of the length of piling upon which the fixture is secured, the flanged extension forming a pocket adapted to close upon the edge of a companion length of piling that stands in edge to edge alignment, thus securing the two lengths of piling to limited transverse movement in the direction of their planar extent, but permitting unlimited relative longitudinal movement.

3. An assembling fixture for sheet piling consisting of two plates equipped with spacing members and means for securing the plates rigidly in application upon opposite faces of a length of piling with lateral extension therefrom, such means including a pin secured to one of said plates and penetrating the length of piling and the other of said plates, and a clamping wedge simultaneously engaging the pin and the other said plate, the said plates with their spacing members forming in such assembly an eye adapted to be closed upon the edge of an adjacent length of piling that stands in edge to edge alignment, such assembly permitting relative transverse movement within fixed limits between the two lengths of piling in the direction of their planar extent, and unlimited relative longitudinal movement.

4. An assembling fixture for sheet piling of channel-shaped cross-section with the channels of succeeeding lengths oppositely directed, such fixture including two plate members provided with spacing flanges and with means for securing the plates rigidly in application to a length of piling, one plate in abutment upon the median web of the length of piling upon one side and the other in abutment upon the coupling edges of the length upon the other side, and the fixture extending laterally from the length of piling to which it is secured, and the flanges themselves extending in the direction of the length of piling to which the fixture is secured, the assembled plates forming a pocket adapted to close upon the coupling edge of an adjacent oppositely directed length of piling that stands in edge to edge alignment and to form an engagement therewith permissive of limited relative movement between the two lengths of piling in transverse direction and in the direction of their planar extent and of unlimited relative movement in longitudinal direction, such fixture being invertible and thereby applicable to each successive length in effecting assembly with the next preceding section.

JAMES S. MILLER.
BYRON E. RHOADS.